(12) United States Patent  
Lubomirsky

(10) Patent No.: US 8,570,005 B2  
(45) Date of Patent: Oct. 29, 2013

(54) DIRECT CURRENT LINK CIRCUIT

(75) Inventor: Vadim Lubomirsky, Hod Hasharon (IL)

(73) Assignee: Solaredge Technologies Ltd., Hod Hasharon (IL)

( * ) Notice: Subject to any disclaimer, the term of this patent is extended or adjusted under 35 U.S.C. 154(b) by 157 days.

(21) Appl. No.: 13/229,991

(22) Filed: Sep. 12, 2011

(65) Prior Publication Data

US 2013/0063119 A1    Mar. 14, 2013

(51) Int. Cl.
*G05F 1/24*    (2006.01)

(52) U.S. Cl.
USPC ............... 323/259; 323/267; 363/90; 363/95; 363/131

(58) Field of Classification Search
USPC ......... 323/222, 223, 232, 235, 247, 259, 267, 323/271, 305, 328, 344, 345, 346; 363/37, 363/40, 89, 90, 95, 97, 131
See application file for complete search history.

(56) References Cited

U.S. PATENT DOCUMENTS

| | | | |
|---|---|---|---|
| 3,369,210 A | 2/1968 | Manickella | |
| 3,596,229 A | 7/1971 | Hohorst | |
| 3,958,136 A | 5/1976 | Schroeder | |
| 4,060,757 A | 11/1977 | McMurray | |
| 4,101,816 A | 7/1978 | Shepter | |
| 4,171,861 A | 10/1979 | Hohorst | |
| 4,257,087 A | 3/1981 | Cuk | |
| 4,452,867 A | 6/1984 | Conforti | |
| 4,460,232 A | 7/1984 | Sotolongo | |
| 4,481,654 A | 11/1984 | Daniels et al. | |
| 4,554,515 A | 11/1985 | Burson et al. | |
| 4,598,330 A | 7/1986 | Woodworth | |
| 4,602,322 A * | 7/1986 | Merrick | ........................ 363/127 |
| 4,623,753 A | 11/1986 | Feldman et al. | |
| 4,637,677 A | 1/1987 | Barkus | |
| 4,641,042 A | 2/1987 | Miyazawa | |
| 4,641,079 A | 2/1987 | Kato et al. | |
| 4,644,458 A | 2/1987 | Harafuji et al. | |

(Continued)

FOREIGN PATENT DOCUMENTS

| | | |
|---|---|---|
| CN | 1309451 A | 8/2001 |
| DE | 19737286 A1 | 3/1999 |

(Continued)

OTHER PUBLICATIONS

Ciobotaru, et al., Control of single-stage single-phase PV inverter, Aug. 7, 2006.

(Continued)

*Primary Examiner* — Nguyen Tran
(74) *Attorney, Agent, or Firm* — Banner & Witcoff, Ltd.

(57) ABSTRACT

A device for converting power from a floating source of DC power to a dual direct current (DC) output, the device includes: positive and negative input terminals connectible to the floating source of DC power; and positive and negative, and ground output terminals connectible to the dual DC output that may feed an inverter. The inverter may be either a two or three level inverter. A charge storage device may be connected in parallel to, and charged from, the positive and negative input terminals. A resonant circuit may be also connected between the charge storage device and the dual DC output. The resonant circuit may include an inductor connected in series with a capacitor. The charge storage device may discharge through the resonant circuit by switching through to either the negative output terminal or the positive output terminal.

22 Claims, 3 Drawing Sheets

(56) References Cited

U.S. PATENT DOCUMENTS

| | | |
|---|---|---|
| 4,652,770 A | 3/1987 | Kumano |
| 4,706,181 A | 11/1987 | Mercer |
| 4,720,667 A | 1/1988 | Lee et al. |
| 4,720,668 A | 1/1988 | Lee et al. |
| 4,783,728 A | 11/1988 | Hoffman |
| RE33,057 E | 9/1989 | Clegg et al. |
| 4,868,379 A | 9/1989 | West |
| 4,888,063 A | 12/1989 | Powell |
| 4,888,702 A | 12/1989 | Gerken et al. |
| 4,899,269 A | 2/1990 | Rouzies |
| 4,903,851 A | 2/1990 | Slough |
| 4,910,518 A | 3/1990 | Kim et al. |
| 4,978,870 A | 12/1990 | Chen et al. |
| 4,987,360 A | 1/1991 | Thompson |
| 5,045,988 A | 9/1991 | Gritter et al. |
| 5,081,558 A | 1/1992 | Mahler |
| 5,191,519 A | 3/1993 | Kawakami |
| 5,280,232 A | 1/1994 | Kohl et al. |
| 5,287,261 A | 2/1994 | Ehsani |
| 5,327,071 A | 7/1994 | Frederick et al. |
| 5,345,375 A | 9/1994 | Mohan |
| 5,402,060 A | 3/1995 | Erisman |
| 5,446,645 A | 8/1995 | Shirahama et al. |
| 5,460,546 A | 10/1995 | Kunishi et al. |
| 5,493,154 A | 2/1996 | Smith et al. |
| 5,497,289 A | 3/1996 | Sugishima et al. |
| 5,517,378 A | 5/1996 | Asplund et al. |
| 5,530,335 A | 6/1996 | Decker et al. |
| 5,548,504 A | 8/1996 | Takehara |
| 5,604,430 A | 2/1997 | Decker et al. |
| 5,616,913 A | 4/1997 | Litterst |
| 5,644,219 A | 7/1997 | Kurokawa |
| 5,646,501 A | 7/1997 | Fishman et al. |
| 5,659,465 A | 8/1997 | Flack et al. |
| 5,686,766 A | 11/1997 | Tamechika |
| 5,773,963 A | 6/1998 | Blanc et al. |
| 5,777,515 A | 7/1998 | Kimura |
| 5,777,858 A | 7/1998 | Rodulfo |
| 5,780,092 A | 7/1998 | Agbo et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,822,186 A | 10/1998 | Bull et al. |
| 5,838,148 A | 11/1998 | Kurokami et al. |
| 5,869,956 A | 2/1999 | Nagao et al. |
| 5,873,738 A | 2/1999 | Shimada et al. |
| 5,886,882 A | 3/1999 | Rodulfo |
| 5,886,890 A | 3/1999 | Ishida et al. |
| 5,892,354 A | 4/1999 | Nagao et al. |
| 5,905,645 A | 5/1999 | Cross |
| 5,919,314 A | 7/1999 | Kim |
| 5,923,158 A | 7/1999 | Kurokami et al. |
| 5,932,994 A | 8/1999 | Jo et al. |
| 5,933,327 A | 8/1999 | Leighton et al. |
| 5,945,806 A | 8/1999 | Faulk |
| 5,949,668 A | 9/1999 | Schweighofer |
| 5,963,010 A | 10/1999 | Hayashi et al. |
| 5,990,659 A | 11/1999 | Frannhagen |
| 6,002,290 A | 12/1999 | Avery et al. |
| 6,031,736 A | 2/2000 | Takehara et al. |
| 6,037,720 A | 3/2000 | Wong et al. |
| 6,038,148 A | 3/2000 | Farrington et al. |
| 6,046,919 A | 4/2000 | Madenokouji et al. |
| 6,050,779 A | 4/2000 | Nagao et al. |
| 6,078,511 A | 6/2000 | Fasullo et al. |
| 6,081,104 A | 6/2000 | Kern |
| 6,082,122 A | 7/2000 | Madenokouji et al. |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,219,623 B1 | 4/2001 | Wills |
| 6,255,360 B1 | 7/2001 | Domschke et al. |
| 6,256,234 B1 | 7/2001 | Keeth et al. |
| 6,259,234 B1 | 7/2001 | Perol |
| 6,262,558 B1 | 7/2001 | Weinberg |
| 6,285,572 B1 | 9/2001 | Onizuka et al. |
| 6,292,379 B1 | 9/2001 | Edevold et al. |
| 6,301,128 B1 | 10/2001 | Jang et al. |
| 6,304,065 B1 | 10/2001 | Wittenbreder |
| 6,320,769 B2 | 11/2001 | Kurokami et al. |
| 6,339,538 B1 | 1/2002 | Handleman |
| 6,351,130 B1 | 2/2002 | Preiser et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,433,522 B1 | 8/2002 | Siri |
| 6,448,489 B2 | 9/2002 | Kimura et al. |
| 6,452,814 B1 | 9/2002 | Wittenbreder |
| 6,493,246 B2 | 12/2002 | Suzui et al. |
| 6,507,176 B2 | 1/2003 | Wittenbreder, Jr. |
| 6,531,848 B1 | 3/2003 | Chitsazan et al. |
| 6,545,211 B1 | 4/2003 | Mimura |
| 6,548,205 B2 | 4/2003 | Leung et al. |
| 6,587,051 B2 | 7/2003 | Takehara et al. |
| 6,590,793 B1 | 7/2003 | Nagao et al. |
| 6,593,521 B2 | 7/2003 | Kobayashi |
| 6,608,468 B2 | 8/2003 | Nagase |
| 6,611,130 B2 * | 8/2003 | Chang ............................ 323/235 |
| 6,611,441 B2 | 8/2003 | Kurokami et al. |
| 6,628,011 B2 | 9/2003 | Droppo et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,672,018 B2 | 1/2004 | Shingleton |
| 6,678,174 B2 | 1/2004 | Suzui et al. |
| 6,690,590 B2 | 2/2004 | Stamenic et al. |
| 6,731,136 B2 | 5/2004 | Knee |
| 6,738,692 B2 | 5/2004 | Schienbein et al. |
| 6,744,643 B2 | 6/2004 | Luo et al. |
| 6,765,315 B2 | 7/2004 | Hammerstrom et al. |
| 6,768,047 B2 | 7/2004 | Chang et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,801,442 B2 | 10/2004 | Suzui et al. |
| 6,850,074 B2 | 2/2005 | Adams et al. |
| 6,882,131 B1 | 4/2005 | Takada et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,936,995 B2 | 8/2005 | Kapsokavathis et al. |
| 6,950,323 B2 | 9/2005 | Achleitner et al. |
| 6,963,147 B2 | 11/2005 | Kurokami et al. |
| 6,984,967 B2 | 1/2006 | Notman |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,148,669 B2 | 12/2006 | Maksimovic et al. |
| 7,158,359 B2 | 1/2007 | Bertele et al. |
| 7,158,395 B2 | 1/2007 | Deng et al. |
| 7,174,973 B1 | 2/2007 | Lysaght |
| 7,193,872 B2 | 3/2007 | Siri |
| 7,218,541 B2 | 5/2007 | Price et al. |
| 7,248,946 B2 | 7/2007 | Bashaw et al. |
| 7,256,566 B2 | 8/2007 | Bhavaraju et al. |

(56) References Cited

U.S. PATENT DOCUMENTS

| | | | |
|---|---|---|---|
| 7,277,304 B2 | 10/2007 | Stancu et al. |
| 7,281,141 B2 | 10/2007 | Elkayam et al. |
| 7,282,814 B2 | 10/2007 | Jacobs |
| 7,291,036 B1 | 11/2007 | Daily et al. |
| RE39,976 E | 1/2008 | Schiff et al. |
| 7,336,056 B1 | 2/2008 | Dening |
| 7,348,802 B2 | 3/2008 | Kasanyal et al. |
| 7,352,154 B2 | 4/2008 | Cook |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,394,237 B2 | 7/2008 | Chou et al. |
| 7,420,815 B2 | 9/2008 | Love |
| 7,435,134 B2 | 10/2008 | Lenox |
| 7,435,897 B2 | 10/2008 | Russell |
| 7,471,014 B2 | 12/2008 | Lum et al. |
| 7,504,811 B2 | 3/2009 | Watanabe et al. |
| 7,589,437 B2 | 9/2009 | Henne et al. |
| 7,600,349 B2 | 10/2009 | Liebendorfer |
| 7,602,080 B1 | 10/2009 | Hadar et al. |
| 7,605,498 B2 | 10/2009 | Ledenev et al. |
| 7,612,283 B2 | 11/2009 | Toyomura et al. |
| 7,646,116 B2 | 1/2010 | Batarseh et al. |
| 7,719,140 B2 | 5/2010 | Ledenev et al. |
| 7,748,175 B2 | 7/2010 | Liebendorfer |
| 7,759,575 B2 | 7/2010 | Jones et al. |
| 7,763,807 B2 | 7/2010 | Richter |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 | 8/2010 | Lu et al. |
| 7,804,282 B2 | 9/2010 | Bertele |
| 7,812,701 B2 | 10/2010 | Lee et al. |
| 7,839,022 B2 | 11/2010 | Wolfs |
| 7,843,085 B2 | 11/2010 | Ledenev et al. |
| 7,868,599 B2 | 1/2011 | Rahman et al. |
| 7,880,334 B2 | 2/2011 | Evans et al. |
| 7,893,346 B2 | 2/2011 | Nachamkin et al. |
| 7,900,361 B2 | 3/2011 | Adest et al. |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,058,747 B2 | 11/2011 | Avrutsky et al. |
| 8,058,752 B2 | 11/2011 | Erickson, Jr. et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 8,098,055 B2 * | 1/2012 | Avrutsky et al. ............... 323/222 |
| 8,102,144 B2 | 1/2012 | Capp et al. |
| 8,111,052 B2 | 2/2012 | Glovinsky |
| 8,116,103 B2 * | 2/2012 | Zacharias et al. ............... 363/17 |
| 8,138,914 B2 | 3/2012 | Wong et al. |
| 8,204,709 B2 | 6/2012 | Presher, Jr. et al. |
| 8,289,742 B2 | 10/2012 | Adest et al. |
| 8,415,937 B2 | 4/2013 | Hester |
| 8,436,592 B2 | 5/2013 | Saitoh |
| 2001/0023703 A1 | 9/2001 | Kondo et al. |
| 2001/0034982 A1 | 11/2001 | Nagao et al. |
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0041548 A1 | 3/2004 | Perry |
| 2004/0061527 A1 | 4/2004 | Knee |
| 2004/0125618 A1 | 7/2004 | De Rooij et al. |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0121067 A1 | 6/2005 | Toyomura et al. |
| 2005/0162018 A1 | 7/2005 | Realmuto et al. |
| 2005/0172995 A1 | 8/2005 | Rohrig et al. |
| 2005/0226017 A1 | 10/2005 | Kotsopoulos et al. |
| 2005/0281064 A1 | 12/2005 | Olsen et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0013349 A1 | 1/2007 | Bassett |
| 2007/0044837 A1 | 3/2007 | Simburger et al. |
| 2007/0075689 A1 * | 4/2007 | Kinder et al. ............... 323/259 |
| 2007/0075711 A1 | 4/2007 | Blanc et al. |
| 2007/0081364 A1 | 4/2007 | Andreycak |
| 2007/0147075 A1 | 6/2007 | Bang |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0247877 A1 | 10/2007 | Kwon et al. |
| 2007/0273342 A1 | 11/2007 | Kataoka et al. |
| 2007/0290636 A1 | 12/2007 | Beck et al. |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0218152 A1 | 9/2008 | Bo |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |

(56) References Cited

U.S. PATENT DOCUMENTS

| | | |
|---|---|---|
| 2008/0246463 A1 | 10/2008 | Sinton et al. |
| 2008/0252273 A1 | 10/2008 | Woo et al. |
| 2008/0303503 A1 | 12/2008 | Wolfs |
| 2009/0039852 A1 | 2/2009 | Fishelov et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0184746 A1 | 7/2009 | Fahrenbruch |
| 2009/0190275 A1 | 7/2009 | Gilmore et al. |
| 2009/0206666 A1 | 8/2009 | Sella et al. |
| 2009/0224817 A1 | 9/2009 | Nakamura et al. |
| 2009/0237042 A1 | 9/2009 | Glovinski |
| 2009/0237043 A1 | 9/2009 | Glovinsky |
| 2009/0242011 A1 | 10/2009 | Proisy et al. |
| 2009/0273241 A1 | 11/2009 | Gazit et al. |
| 2009/0282755 A1 | 11/2009 | Abbott et al. |
| 2009/0284998 A1 | 11/2009 | Zhang et al. |
| 2009/0322494 A1 | 12/2009 | Lee |
| 2010/0001587 A1 | 1/2010 | Casey et al. |
| 2010/0052735 A1 | 3/2010 | Burkland et al. |
| 2010/0085670 A1 | 4/2010 | Palaniswami et al. |
| 2010/0124027 A1 | 5/2010 | Handelsman et al. |
| 2010/0127571 A1 | 5/2010 | Hadar et al. |
| 2010/0139743 A1 | 6/2010 | Hadar et al. |
| 2010/0176773 A1 | 7/2010 | Capel |
| 2010/0181957 A1 | 7/2010 | Goeltner |
| 2010/0214808 A1 | 8/2010 | Rodriguez |
| 2010/0244575 A1 | 9/2010 | Coccia et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0294528 A1 | 11/2010 | Sella et al. |
| 2010/0294903 A1 | 11/2010 | Shmukler et al. |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2011/0006743 A1 | 1/2011 | Fabbro |
| 2011/0037600 A1 | 2/2011 | Takehara et al. |
| 2011/0043172 A1 | 2/2011 | Dearn |
| 2011/0079263 A1 | 4/2011 | Avrutsky |
| 2011/0084553 A1 | 4/2011 | Adest et al. |
| 2011/0114154 A1 | 5/2011 | Lichy et al. |
| 2011/0121652 A1 | 5/2011 | Sella et al. |
| 2011/0125431 A1 | 5/2011 | Adest et al. |
| 2011/0133552 A1 | 6/2011 | Binder et al. |
| 2011/0140536 A1 | 6/2011 | Adest et al. |
| 2011/0181251 A1 | 7/2011 | Porter et al. |
| 2011/0181340 A1 | 7/2011 | Gazit |
| 2011/0210611 A1 | 9/2011 | Ledenev et al. |
| 2011/0254372 A1 | 10/2011 | Haines et al. |
| 2011/0260866 A1 | 10/2011 | Avrutsky et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0316346 A1 | 12/2011 | Porter et al. |
| 2012/0007613 A1 | 1/2012 | Gazit |
| 2012/0019966 A1 | 1/2012 | DeBoer |
| 2012/0032515 A1 | 2/2012 | Ledenev et al. |
| 2012/0081009 A1 | 4/2012 | Shteynberg et al. |
| 2012/0091810 A1 | 4/2012 | Aiello et al. |

FOREIGN PATENT DOCUMENTS

| | | |
|---|---|---|
| DE | 102005030907 A1 | 1/2007 |
| DE | 102008057874 A1 | 5/2010 |
| EP | 419093 A2 | 3/1991 |
| EP | 420295 A1 | 4/1991 |
| EP | 604777 A1 | 7/1994 |
| EP | 756178 A2 | 1/1997 |
| EP | 827254 A2 | 3/1998 |
| EP | 1039621 A2 | 9/2000 |
| EP | 1330009 A2 | 7/2003 |
| EP | 1503490 A1 | 2/2005 |
| EP | 1531542 A2 | 5/2005 |
| EP | 1531545 A2 | 5/2005 |
| EP | 1657557 A1 | 5/2006 |
| EP | 1657797 A1 | 5/2006 |
| EP | 1887675 A2 | 2/2008 |
| EP | 2048679 A1 | 4/2009 |
| EP | 2315328 A2 | 4/2011 |
| EP | 2393178 A2 | 12/2011 |
| ES | 2249147 A1 | 3/2006 |
| ES | 2249149 A1 | 3/2006 |
| GB | 2476508 A | 6/2011 |
| GB | 2480015 A | 11/2011 |
| GB | 2480015 B | 11/2011 |
| JP | 61065320 A | 4/1986 |
| JP | 6165310 A | 6/1994 |
| JP | 8009557 A | 1/1996 |
| JP | 11041832 A | 2/1999 |
| JP | 11103538 A | 4/1999 |
| JP | 11206038 A | 7/1999 |
| JP | 11289891 A | 10/1999 |
| JP | 11318042 A | 11/1999 |
| JP | 2000339044 A | 12/2000 |
| JP | 2002230735 A | 10/2002 |
| JP | 2003124492 A | 4/2003 |
| JP | 2003134667 A | 5/2003 |
| JP | 2004194500 A | 7/2004 |
| JP | 2004260944 A | 9/2004 |
| JP | 2004334704 A | 11/2004 |
| JP | 2005192314 A | 7/2005 |
| JP | 2007058845 A | 3/2007 |
| WO | 9313587 A1 | 7/1993 |
| WO | 9613093 A1 | 5/1996 |
| WO | 9823021 A2 | 5/1998 |
| WO | 00/00839 A1 | 1/2000 |
| WO | 00/21178 A1 | 4/2000 |
| WO | 0075947 A1 | 12/2000 |
| WO | 0231517 | 4/2002 |
| WO | 03050938 A2 | 6/2003 |
| WO | 03071655 A1 | 8/2003 |
| WO | 2004023278 A2 | 3/2004 |
| WO | 2004090993 A2 | 10/2004 |
| WO | 2004107543 A2 | 12/2004 |
| WO | 2005076444 A1 | 8/2005 |
| WO | 2005076445 A1 | 8/2005 |
| WO | 2006005125 A1 | 1/2006 |
| WO | 2006007198 A1 | 1/2006 |
| WO | 2006078685 A2 | 7/2006 |
| WO | 2007006564 A2 | 1/2007 |
| WO | 2007048421 A2 | 5/2007 |
| WO | 2007073951 A1 | 7/2007 |
| WO | 2007084196 A2 | 7/2007 |
| WO | 2007090476 A2 | 8/2007 |
| WO | 2007113358 A1 | 10/2007 |
| WO | 2008008528 A2 | 1/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009007782 A2 | 1/2009 |
| WO | 2009046533 A1 | 4/2009 |
| WO | 2009051853 A1 | 4/2009 |
| WO | 2009118682 A2 | 10/2009 |
| WO | 2009118683 A2 | 10/2009 |
| WO | 2009073868 A1 | 11/2009 |
| WO | 2009136358 A1 | 11/2009 |
| WO | 2010/002960 A1 | 1/2010 |
| WO | 2010065043 A1 | 6/2010 |

(56) References Cited

FOREIGN PATENT DOCUMENTS

| WO | 2010065388 A1 | 6/2010 |
|----|---------------|--------|
| WO | 2010072717 A1 | 7/2010 |
| WO | 2010078303 A2 | 7/2010 |
| WO | 2010094012 A1 | 8/2010 |
| WO | 2010134057 A1 | 11/2010 |
| WO | 2011011711 A2 | 1/2011 |
| WO | 2011017721 A1 | 2/2011 |
| WO | 2011023732 A2 | 3/2011 |
| WO | 2011059067 A1 | 5/2011 |
| WO | 2011074025 A1 | 6/2011 |

OTHER PUBLICATIONS

International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Converence, Feb. 2001, Colorado Power Electronics Center Publications.
Chen, et al., "Buck-Boost PWM Converters Having Two Independently Controlled Switches", IEEE Power Electronics Specialists Converence, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "PhotoVoltaic DC-DC Module Integrated Converter for Novel Cascaded and Bypass Grid Connection Topologies-Design and Optimisation", 37th IEEE Power Electronics Specialists Converence, Jun. 18-22, 2006, Jeju, Korea.
Geoffrey R. Walker Affidavit re: U.S. Appl. No. 11/950,307.
Geoffrey R. Walker Affidavit re: U.S. Appl. No. 11/950,271.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solor Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, Intelec 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Lindgren, "Topology for Decentralised Solar Energy Inverters with a Low Voltage AC-Bus", Chalmers University of Technology, Department of Electrical Power Engineering, EPE '99—Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma, "A Modular Fuel Cell, Modular DC-DC Converter Concept for High Performance and Enhanced Reliability", IEEE 2007, pp. 2633-2638.
Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Matsui, et al., "A New Maximum Photovoltaic Power Tracking Control Scheme Based on Power Equilibrium at DC Link", IEEE, 1999, pp. 804-809.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009136358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
UK Intellectual Property office, Combined Search and Examination Report for GB1100450.4 under Sections 17 and 18(3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and The National Electrical

(56) References Cited

OTHER PUBLICATIONS

Code: Suggested Practices", by John Wiles, Southwest Technology Development Instutte New Mexico State University Las Cruces, NM.

United Kingdom Intellectual Property Office, Combined Search and Examination Report Under Sections 17 and 18(3), GB1020862.7, dated Jun. 16, 2011.

QT Technical Application Papers, "ABB Circuit-Breakers for Direct current Applications", ABB Sace S.p.A., An ABB Group Coupany, L.V. Breakers, Via Baioni, 35, 24123 Bergamo-Italy, Tel.: +39 035. 395.111—Telefax: +39 035.395.306-433, Sep. 2007.

Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

Fairchild Semiconductor, Application Note 9016, IGBT Basics 1, by K.S. OH Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

ISR for PCT/IL07/01064 dated Mar. 25, 2008.

IPRP for PCT/IB2007/004584 dated Jun. 10, 2009, with Written Opinion.

IPRP for PCT/IB2007/004591 dated Jul. 13, 2010, with Written Opinion.

IPRP for PCT/IB2007/004643 dated Jun. 10, 2009, with Written Opinion.

Written Opinion for PCT/IB2008/055092 submitted with IPRP dated Jun. 8, 2010.

IPRP for PCT/US2008/085754 dated Jun. 8, 2010, with Written Opinion dated Jan. 21, 2009.

IPRP for PCT/US2008/085755 dated Jun. 8, 2010, with Written Opinion dated Jan. 20, 2009.

IPRP for PCT/IB2009/051221 dated Sep. 28, 2010, with Written Opinion.

IPRP for PCT/IB2009/051222 dated Sep. 28, 2010, with Written Opinion.

IPRP for PCT/IB2009/051831 dated Nov. 9, 2010, with Written Opinion.

IPRP for PCT/US2008/085736 dated Jun. 7, 2011, with Written Opinion.

IPRP for PCT/IB2010/052287 dated Nov. 22, 2011, with Written Opinion.

ISR for PCT/IB2010/052413 dated Sep. 7, 2010.

UK Intellectual Property Office, Application No. GB1109618.7, Patents Act 1977, Examination Report Under Section 18(3), Sep. 16, 2011.

UK Intellectual Property Office, Patents Act 1977: Patents Rules Notification of Grant: Patent Serial No. GB2480015, Nov. 29, 2011.

Walker, et al. "PV String Per-Module Maximim Power Point Enabling Converters", School of Information Technology and Electrical Engineering The Univiversity of Queensland, Sep. 28, 2003.

Walker, "Cascaded DC-DC Converter Connection of Photovoltaic Modules", 33rd Annual IEEE Power Electronics Specialists Conference. PESC 2002. Conference Proceedings. Cairns, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.

Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.

Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.

Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.

Duarte, "A Family of ZVX-PWM Active-Clamping DC-to-DC Converters: Synthesis, Analysis and Experimentation", Telecommunications Energy Conference, 1995, Intelec '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504

IPRP for PCT/IL2007/001064 dated Mar. 17, 2009, with Written Opinion dated Mar. 25, 2008.

IPRP for PCT/IB2007/004586 dated Jun. 10, 2009, with Written Opinion.

Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.

Extended European Search Report—EP12176089.6—Mailing date: Nov. 8, 2012.

Gwon-Jong Yu et al: "Maximum power point tracking with temperature compensation of photovoltaic for air conditioning system with fuzzy controller", 19960513; 19960513-19960517, May 13, 1996, pp. 1429-1432, XP010208423.

Extended European Search Report—EP12177067.1—Mailing Date: Dec. 7, 2012.

GB Combined Search and Examination Report—GB1200423.0—Mailing date: Apr. 30, 2012.

GB Combined Search and Examination Report—GB1201499.9—Mailing date: May 28, 2012.

GB Combined Search and Examination Report—GB1201506.1—Mailing date: May 22, 2012.

"Study of Energy Storage Capacitor Reduction for Single Phase PWM Rectifier", Ruxi Wang et al., Virginia Polytechnic Institute and State University, Feb. 2009.

"Multilevel Inverters: A Survey of Topologies, Controls, and Applications", José Rodríguez et al., IEEE Transactions on Industrial Electronics, vol. 49, No. 4, Aug. 2002.

Extended European Search Report—EP 08878650.4—Mailing date: Mar. 28, 2013.

Satcon Solstice—Satcon Solstice 100 kW System Solution Sheet—2010.

John Xue, "PV Module Series String Balancing Converters", University of Queensland—School of Infroamtion Technology & Electrical Engineering, Nov. 6, 2002.

Robert W. Erickson, "Future of Power Electronics for Photovoltaics", IEEE Applied Power Electronics Conference, Feb. 2009.

GB Combined Search and Examination Report—GB1203763.6—Mailing date: Jun. 25, 2012.

Mohammad Reza Amini et al., "Quasi REsonant DC Link Inverter with a Simple Auxiliary Circuit", Journal of Power Electronics, vol. 11, No. 1, Jan. 2011.

(56) References Cited

OTHER PUBLICATIONS

Khairy Fathy et al., "A Novel Quasi-Resonant Snubber-Assisted ZCS-PWM DC-DC Converter with High Frequency Link", Journal of Power Electronics, vol. 7, No. 2, Apr. 2007.
Cheng K.W.E., "New Generation of Switched Capacitor Converters", Department of Electrical Engineering, The Hong Kong Polytechnic University, Hung Hom, Hong Kong, Power Electronics Conference, 1998, PESC 98.
Per Karlsson, "Quasi Resonant DC Link Converters—Analysis and Design for a Battery Charger Application", Universitetstryckeriet, Lund University, 1999, ISBN 91-88934-14-4.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Yuang-Shung Lee et al.,"A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of tests and simulations", Jun. 2000.
Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
C. Liu et al., "Advanced Algorithm for MPPT Control of Photovoltaic Systems", Canadian Solar Buildings Conference, Montreal, Aug. 20-24, 2004.
Chihchiang Hua and Chihming Shen, "Study of Maximum Power Tracking Techniques and Control of DC/DC Converters for Photovoltaic Power System", IEEE 1998.
Tore Skjellnes et al., "Load sharing for parallel inverters without communication", Nordic Workshop in Power and Industrial Electronics, Aug. 12-14, 2002.
Giorgio Spiazzi at el., "A New Family of Zero-Current-Switching Variable Frequency dc-dc Converters", IEEE 2000.
Nayar, C.V., M. Ashari and W.W.L Keerthiphala, "A Gridinteractive Photovoltaic Uninterruptible Power Supply System Using Battery Storage and a Back up Diesel Generator", IEEE Transactions on Energy Conversion, vol. 15, No. 3, Sep. 2000, pp. 348?353.
Ph. Strauss et al., "AC coupled PV Hybrid systems and Micro Grids-state of the art and future trends", 3rd World Conference on Photovoltaic Energy Conversion, Osaka, Japan May 11-18, 2003.
Nayar, C.V., abstract, Power Engineering Society Summer Meeting, 2000. IEEE, 2000, pp. 1280-1282 vol. 2.
D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automática / 12 a Sep. 16, 2010, Bonito-MS.
Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—Mailing date: Mar. 26, 2013.

* cited by examiner

DIRECT CURRENT LINK CIRCUIT

TECHNICAL FIELD

Aspects of this disclosure relate to distributed power systems, particularly a photovoltaic power harvesting system and, more particularly to a direct current link circuit connected between a photovoltaic array and a 3-phase inverter circuit.

BACKGROUND

In a conventional photovoltaic power harvesting system configured to feed a single phase or a three phase alternating current (AC) power grid, dual (positive and negative) direct current (DC) power may be generated first from solar panels. The three phase inverter powered by the dual (positive and negative) DC power produces three phase AC power at the output of the three phase inverter. Conventionally, sufficiently high DC voltage may be provided to the input of the three phase inverter by connecting solar panels in series. However, in order to increase overall power conversion efficiency, the sum of positive and negative DC rails required by the inverter may be over 600 volts.

In North America, an input of voltage over 600 volts may create an issue with safety agency approval under regulation UL1741. An approach to avoid the safety issue may include inputting less than 600 volts to a boost circuit or transformer-isolated circuit to generate dual DC rails internally for the inverter input. The additional boost or transformer-isolated circuit increases cost and complexity especially since the additional power converter module generally requires dedicated control and protection features. Additionally, the boost or transformer-isolated circuit may also generate electromagnetic interference (EMI) and may cause reduction in overall efficiency of conversion of DC power to three phase AC power.

Thus there is need for and it would be advantageous to have a DC link circuit with a low voltage input, which does not cause significant reduction in overall efficiency of conversion of DC power to three phase AC power and which provides a sufficiently high DC input voltage to the AC inverter to generate an AC output of the inverter of required magnitude.

BRIEF SUMMARY

Embodiments include a method for converting power from a floating source of DC power to a dual direct current (DC) output. The floating source of DC power includes a positive input terminal and a negative input terminal. The dual DC output includes a positive output terminal, a negative output terminal and a ground terminal. The method includes charging a charge storage device connected in parallel to the positive input terminal and the negative input terminal. The charging may be supplied from the floating source of DC power. The discharging of the charge storage device may be performed by first switching the negative input terminal through a resonant circuit to the negative output terminal during a first half of the period of the resonant circuit, and second, switching the positive input terminal through the resonant circuit to the positive output terminal during a second half of the period of the resonant circuit. During the first switching, a negative return current path may be provided from the negative output terminal to the negative input terminal. During the second switching, a positive current path may be provided from the positive input terminal to the positive output terminal. During the discharging, a negative return current path may be provided from the negative output terminal to the negative input terminal. The negative return current path allows only negative current to flow from the negative input terminal to the negative output voltage terminal. During the discharging, current flow may be blocked from the positive output terminal to the positive input terminal. The resonant circuit may include an inductor connected in series with a capacitor. A positive current path may be provided from the positive input terminal to the positive output terminal. The positive current path allows only positive current to flow from the positive input terminal to the positive output voltage terminal.

Other embodiments include a device for converting power from a floating source of DC power to a dual direct current (DC) output. The device includes a positive input terminal and a negative input terminal connectible to the floating source of DC power, a positive output terminal, a negative output terminal and a ground terminal connectible to the dual DC output. The positive output terminal, the negative output terminal and the ground terminal may feed an inverter. The inverter may be either a two level inverter or a three level inverter. A charge storage device may be connected in parallel to the positive input terminal and the negative input terminal. The charge storage device may be charged from the positive input terminal and the negative input terminal. A resonant circuit may be also connected between the charge storage device and the dual DC output. The resonant circuit may include an inductor connected in series with a capacitor. The charge storage device may discharge through the resonant circuit by switching through to either the negative output terminal or the positive output terminal. The charge storage device may be either a capacitor or a battery. The device may include a positive current path from the positive input terminal of the floating source of direct current DC power to the positive output terminal. The positive current path may include a diode with a cathode connected to the positive output terminal and an anode connected to the positive input terminal. The device may further include a negative return current path from the negative input terminal of the floating source of direct current DC power to the negative output terminal. The negative return current path may include a second diode including an anode connected to the negative output terminal and a cathode connected to the negative input terminal.

Other embodiments may include a device for converting power from a floating source of DC power to a dual direct current (DC) output, the device includes; a positive input terminal and a negative input terminal connectible to the floating source of DC power, a positive output terminal, a negative output terminal and a ground terminal connectible to the dual DC output. A charge storage device may be connected in parallel to the positive input terminal and the negative input terminal. The charge storage device may be charged from the positive input terminal and the negative input terminal. A resonant circuit may be also connected between the charge storage device and the dual DC output. The charge storage device may discharge through the resonant circuit by switching the negative input terminal to the resonant circuit. A switch may be connected between the positive input terminal and the resonant circuit, wherein the switch when closed discharges the charge storage device through the resonant circuit to the negative output terminal. The switch may include an integral diode with a cathode connected to the negative output terminal and an anode connected to the resonant circuit. When the switch is open, the charge storage device may be charged from the positive input terminal. The charge storage device may be charged from the positive input terminal and the negative input terminal and discharged through the resonant circuit by switching the switch. A second switch connected between the negative input terminal and the resonant circuit. The second switch when closed discharges the charge storage device through the resonant circuit to the positive output terminal. When the second switch is open, the charge storage device may be charged from the positive input terminal. The second switch may include a second integral diode with an anode connected to the negative input terminal and a cathode connected to the resonant circuit. The charge storage device may be charged from the positive input terminal and a negative input terminal and discharged through the resonant circuit by switching the second switch. The switch and the second switch may include a silicon controlled rectifier (SCR), insulated gate bipolar junction transistor (IGBT), bipolar junction transistor (BJT), field effect transistor (FET), junction field effect transistor (JFET), mechanically operated single pole double pole switch (SPDT), SPDT electrical relay, SPDT reed relay, SPDT solid state relay, insulated gate field effect transistor (IGFET), diode for alternating current (DIAC) or a triode for alternating current (TRIAC).

Further embodiments include a device for converting power from a floating source of DC power to a dual direct current (DC) output, the device includes; a positive input terminal and a negative input terminal connectible to the floating source of DC power, a positive output terminal, a negative output terminal and a ground terminal connectible to the dual DC output. A charge storage device may be connected in parallel to the positive input terminal and the negative input terminal. The charge storage device may be charged from the positive input terminal and the negative input terminal. The charge storage device discharges through the resonant circuit by switching the negative input terminal to the resonant circuit. The resonant circuit may be connected between the charge storage device and the dual DC output. The resonant circuit may include a first insulated gate bipolar transistor (IGBT) with a first collector attached to the positive input terminal, a first emitter, a first diode including a first anode and a first cathode. The first cathode may be connected to the first collector and the first anode may be connected to the first emitter. A first base may be attached to a first drive circuit. A second IGBT with a second collector may be attached to the first emitter to provide a third node. A second emitter may be connected to the negative input terminal. A second diode with a second cathode may be connected to the second collector and a second anode may be connected to the second emitter. A second base may be attached to a second drive circuit. A DC output may include positive terminal. A second capacitor may be connected between the DC output positive terminal and electrical ground. A DC output may include negative terminal. A third capacitor may be connected between the DC output negative terminal and electrical ground and an inductor connected between the third node and electrical ground.

BRIEF DESCRIPTION OF THE DRAWINGS

Certain embodiments are illustrated by way of example, and not by way of limitation, in the accompanying figures, wherein like reference numerals refer to the like elements throughout.

DETAILED DESCRIPTION

Figure 1:
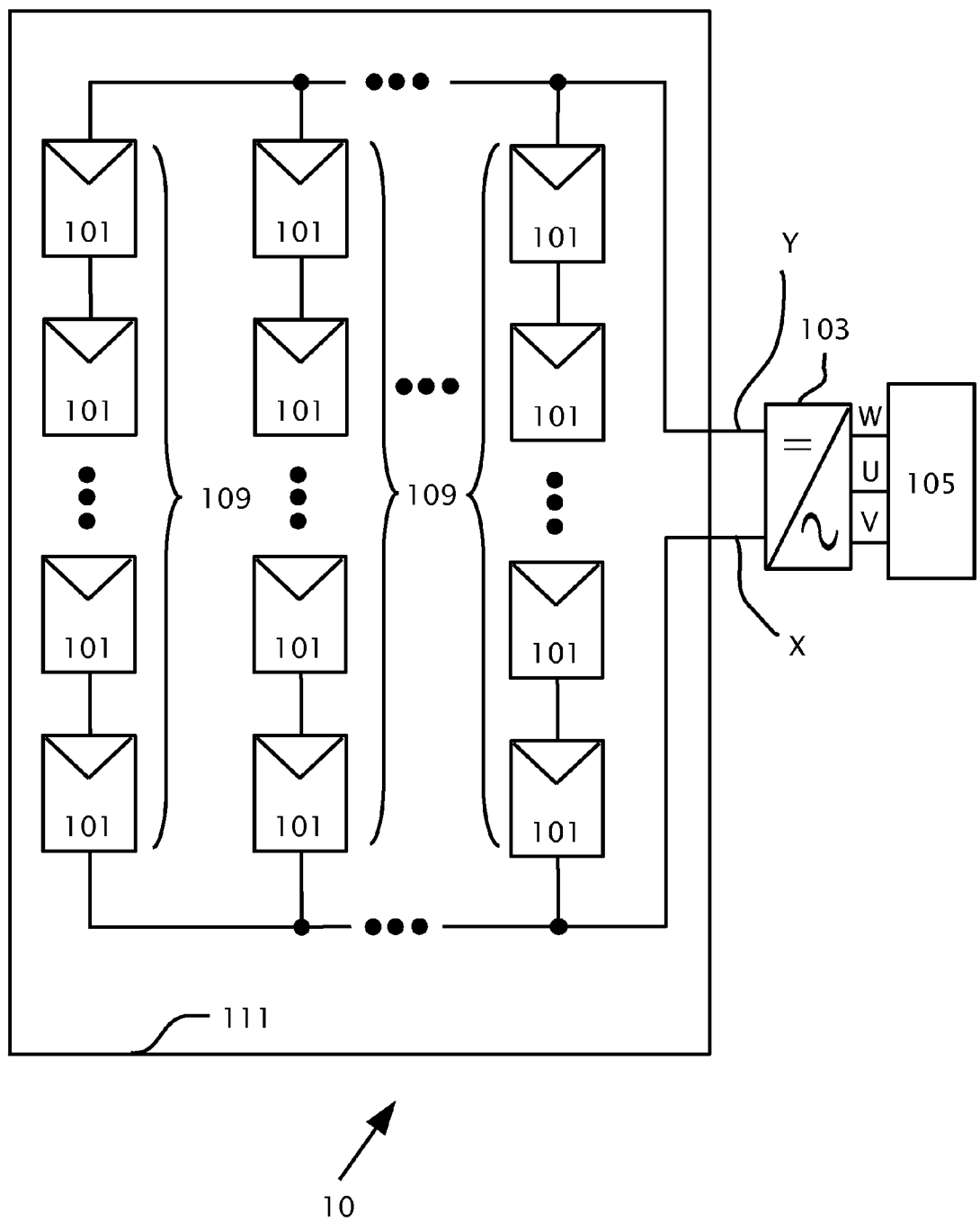
FIG. 1 shows a photovoltaic power harvesting system according to conventional art.

Reference will now be made in detail to features of the present invention, examples of which are illustrated in the accompanying figures. The features are described below to explain the present invention by referring to the figures.

Before explaining features of the invention in detail, it is to be understood that the invention is not limited in its application to the details of design and the arrangement of the components set forth in the following description or illustrated in the figures. The invention is capable of other features or of being practiced or carried out in various ways. Also, it is to be understood that the phraseology and terminology employed herein is for the purpose of description and should not be regarded as limiting. For example, the definite articles "a" and "an" used herein, such as in "a switch" and "a DC output" have the meaning of "one or more," e.g., "one or more switches" and "one or more DC outputs."

It should be noted, that although the discussion herein relates primarily to photovoltaic systems, the present invention may, by non-limiting example, alternatively be configured using other distributed power systems including (but not limited to) wind turbines, hydro turbines, fuel cells, storage systems such as battery, super-conducting flywheel, and capacitors, and mechanical devices including conventional and variable speed diesel engines, Stirling engines, gas turbines, and micro-turbines.

The term "switch" as used herein refers to any of: silicon controlled rectifier (SCR), insulated gate bipolar junction transistor (IGBT), bipolar junction transistor (BJT), field effect transistor (FET), junction field effect transistor (JFET), mechanically operated single pole double pole switch (SPDT), SPDT electrical relay, SPDT reed relay, SPDT solid state relay, insulated gate field effect transistor (IGFET), diode for alternating current (DIAC), and triode for alternating current (TRIAC).

The term "positive current" as used herein refers to a direction of flow of a current from a higher potential point in a circuit to a lower potential difference point in the circuit. The term "negative current" as used herein refers to a flow of return current from a negative DC output to a negative input terminal.

The term "zero current switching" (or "ZCS") as used herein is when the current through a switch is reduced to substantially zero amperes prior to when the switch is being turned either on or off.

The term "power converter" as used herein applies to DC-to-DC converters, AC-to-DC converters, DC-to-AC inverters, buck converters, boost converters, buck-boost converters, full-bridge converters and half-bridge converters or any other type of electrical power conversion/inversion known in the art.

The terms "power grid" and "mains grid" are used herein interchangeably and refer to a source of alternating current (AC) power provided by a power supply company and/or a sink of AC power provided from a distributed power system.

The term "period of a resonant circuit" refers to a time period of a substantially periodic waveform produced by the resonant circuit. The time period is equal to the inverse of the resonant frequency of the resonant circuit.

The term "low input voltage" is used herein refers to a floating (i.e., not referenced to a ground potential) DC voltage input across two terminals of less than 600 Volts or other voltage as specified by a safety regulation.

The term "dual DC" input or output refers to positive and negative terminals that may referenced to a third terminal, such as ground potential, electrical ground or a neutral of an alternating current (AC) supply which may be connected to electrical ground at some point.

The term "two level inverter" as used herein, may refer to its output. The AC phase output of the two level inverter has two voltage levels with respect to a negative terminal. The negative terminal is common to the AC phase output and the direct current (DC) input to the two level inverter. The alternating current (AC) phase output of the two level inverter may be a single phase output a two phase output or a three phase output. Therefore, the single phase output has two voltage levels with respect to the negative terminal. The two phase output has two voltage levels with respect to the negative terminal for each of the two phases. The three phase output has two voltage levels with respect to the negative terminal for each of the three phases.

Similarly, the term "three level inverter" as used herein may refer to an alternating current (AC) phase output of the three level inverter. The AC phase output has three voltage levels with respect to a negative terminal. The negative terminal is common to the AC phase output and the direct current (DC) input to the three level inverter. The alternating current (AC) phase output of the three level inverter may be a single phase output a two phase output or a three phase output. Therefore, the single phase output has three voltage levels with respect to the negative terminal. The two phase output has three voltage levels with respect to the negative terminal for each of the two phases. The three phase output has three voltage levels with respect to the negative terminal for each of the three phases.

The three level inverter compared with the two level inverter may have a cleaner AC output waveform, may use smaller size magnetic components and may have lower losses in power switches, since more efficient lower voltage devices may be used. Three level inverter circuits may have dual (positive and negative) direct current (DC) inputs.

Reference is made to FIG. 1, which shows a photovoltaic power harvesting system 10 according to conventional art. A photovoltaic string 109 includes a series connection of photovoltaic panels 101. Photovoltaic strings 109 may be connected in parallel together in an interconnected array 111, which provides a parallel direct current (DC) power output at DC power lines X and Y. The parallel DC power output supplies the power input of a direct-current-to-alternating-current (DC-to-AC) three phase inverter 103 on DC power lines X and Y. The three phase AC power output of inverter 103 (phases W, U and V) connects across an AC load 105. AC load 105 by way of example may be a three phase AC motor or a three phase electrical power grid.

Figure 2:
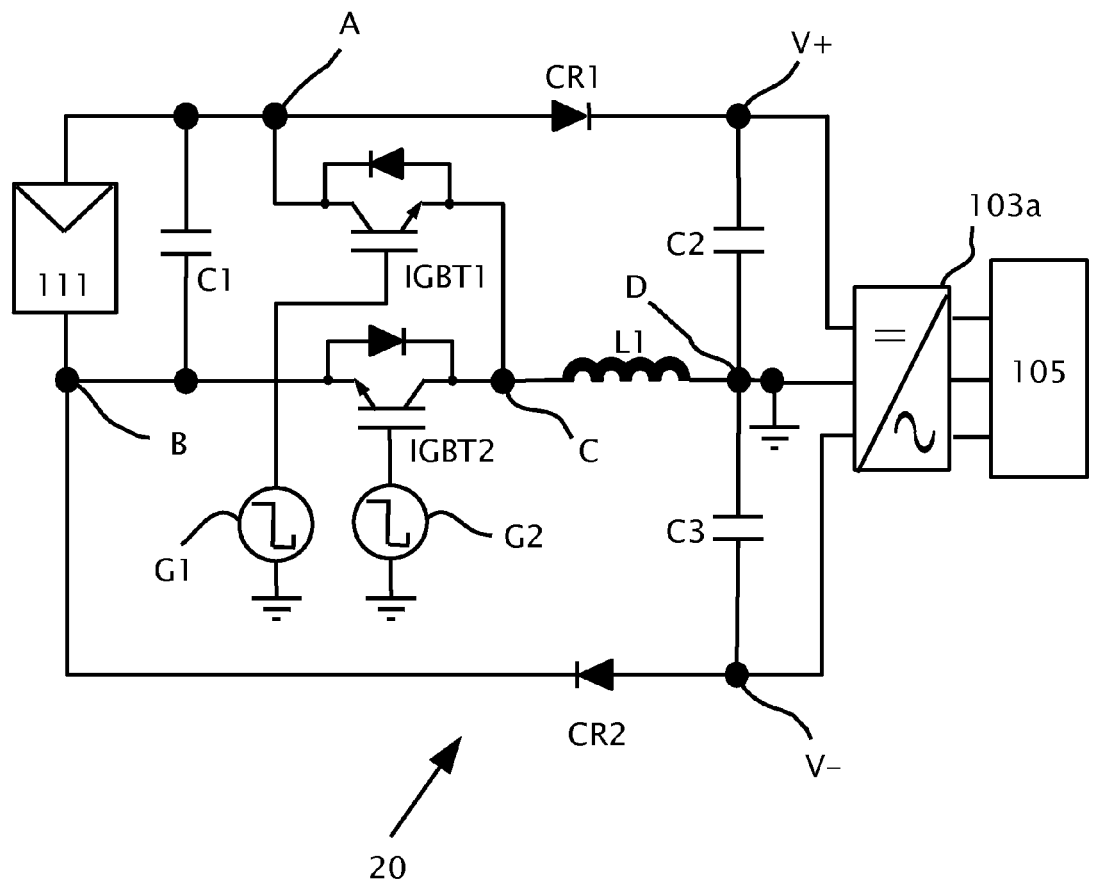
FIG. 2 shows a power harvesting system in accordance with one or more embodiments described herein.

Reference is now made to FIG. 2, which illustrates a power harvesting system 20 according to a feature of the present invention. System 20 includes interconnected photovoltaic array 111, which may provide a floating direct current voltage (DC) on positive input terminal A and negative input terminal B. The floating DC voltage may also be provided from other distributed power systems such as a DC voltage generator for example. Connected across positive and negative input terminals A and B is charge storage device C1, which may be a capacitor. Connected to positive input terminal A is the collector of an insulated gate bipolar transistor (IGBT) IGBT1. The emitter of IGBT1 connects to node C. IGBT1 may include an integrated diode with an anode connected to the emitter and a cathode connected to the collector. Connected to negative input terminal B is the emitter of an insulated gate bipolar transistor (IGBT) IGBT2. The collector of IGBT2 connects to node C. IGBT2 may include an integrated diode with an anode connected to the emitter and a cathode connected to the collector. Drive circuits G1 and G2 are connected to the bases of IGBT1 and IGBT2 respectively and may be referenced to ground. An inductor L1 connects between nodes C and D, where node D may connect to the ground and the ground input of inverter 103*a*. A diode CR1 has an anode connected to positive input terminal A and a cathode connected to node V+. Diode CR1 provides a positive current path between nodes V+ and positive input terminal A. A capacitor C2 connects between node D and node V+. Node V+ provides a DC positive voltage to the input of inverter 103*a*. A diode CR2 has a cathode connected to negative input terminal B and an anode connected to node V−. Diode CR2 provides a negative return current path between nodes V− and node B. Capacitor C3 connects between node D and node V−. Node V− provides a DC negative voltage to the input of inverter 103*a*. Capacitors C2 and C3 may have substantially equal capacitance value. Inverter 103*a* may have a 3 level inverter topology with dual DC input from nodes V+, V− and node D which may be converted to a single phase or a 3 phase AC voltage output, which supplies a load 105, which may be single phase or 3 phase load.

Figure 3:
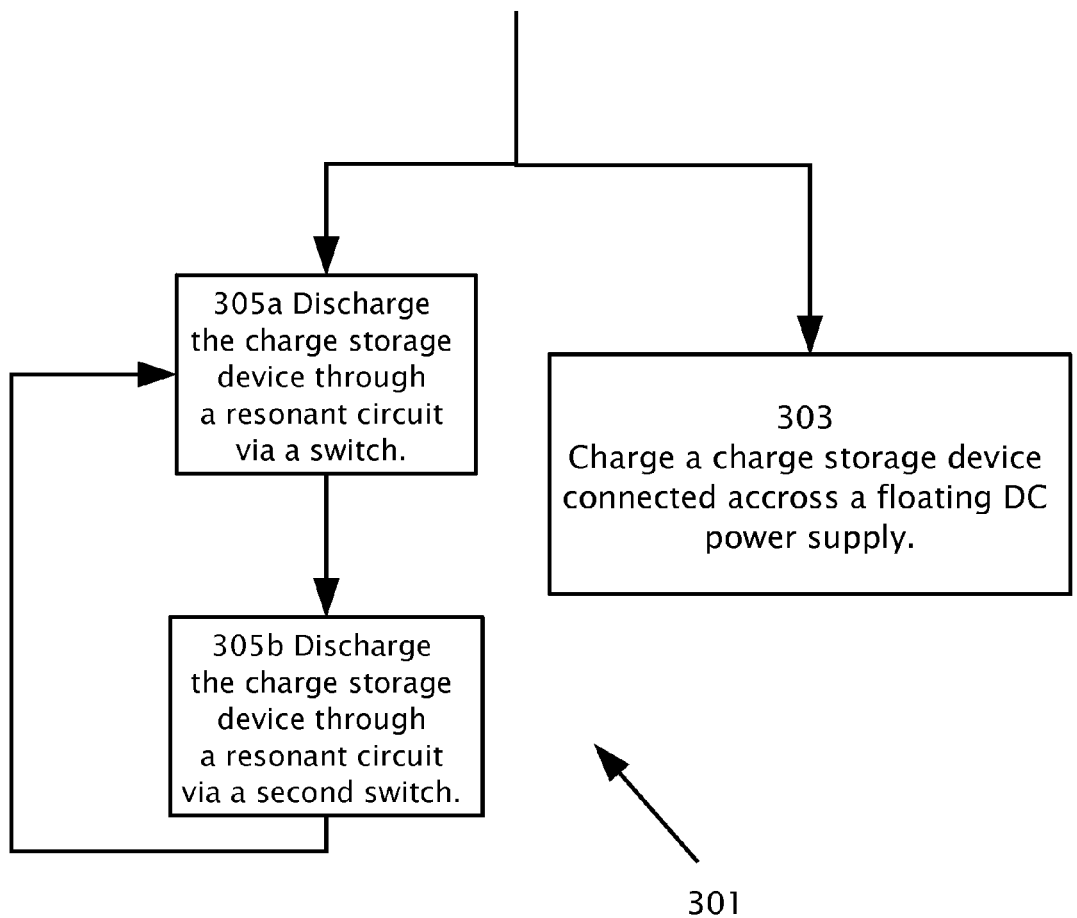
FIG. 3 shows a method for the power harvesting system shown in FIG. 2 according to one or more embodiments described herein.

Reference is now made to FIG. 3, which shows a method 301 applied to power harvesting system 20 shown in FIG. 2, according to a feature of the present invention. In step 303, capacitor C1 may be charged by the floating DC voltage of array 111 by virtue of capacitor C1 being directly connected across array 111 at positive and negative input terminals A and B.

IGBT1 and IGBT2 may be gated alternately such that when IGBT1 is turned on, IGBT2 is off and vice versa by respective drive circuits G1 and G2. IGBT1 and IGBT2 may be gated alternately with less than a 50% duty cycle so as to avoid cross-conduction between IGBT1 and IGBT2 (i.e. to avoid IGBT1 and IGBT2 being on at the same time). A floating voltage provided from array 111 substantially provides a positive voltage on node V+ and a negative voltage on node V− with respect to the ground. The voltages on node V+ and node V− may be substantially equal to the magnitude of the floating voltage. Step 303, which charges capacitor C1 may continue during alternate gating of switches IGBT1 and IGBT2.

When switch IGBT1 is turned on (and IGBT2 turned off), current flows from array 111 and a discharge current flows (step 305*a*) from storage capacitor C1 through collector and emitter of IGBT1, through inductor L1, into capacitor C3 and the input load of inverter 103*a* between ground (node D) and node V−. Inductor L1 and capacitor C3 form a series resonant circuit. The diode across IGBT1 is reverse biased with respect to the voltage at positive input terminal A. The input voltage to inverter 103*a* with respect to ground (node D) and node V− may be derived across capacitor C3. The resonant frequency of inductor L1 and capacitor C3 is given by Eq. 1 and the corresponding resonant periodic time T given in Eq. 2.

$$fo = 1/2\pi (L1 \times C3)^{1/2} \qquad \text{Eq.1}$$

$$T = 1/fo \qquad \text{Eq.2}$$

When IGBT1 initially turns on, there may be both zero current through inductor L1 and through the collector and emitter of IGBT1. After IGBT1 initially turns on, the current through L1 and the current through the collector and emitter of IGBT1 may increase and then fall sinusoidally. When IGBT1 turns off (the on period of the switch corresponds to half of the resonant periodic time T) there may be close to zero current through inductor L1 and through the collector and emitter of IGBT1.

A negative current path between node V− and negative input terminal B may be completed through diode CR2 corresponding to half of the resonant periodic time T.

Step 303 continues as capacitor C1 is still being charged by the floating DC voltage of array 111 by virtue of capacitor C1 being directly connected across array 111 at positive and negative input terminals A and B. When IGBT2 is turned on (and IGBT is turned off), current flows from array 111 and a discharge current (step 305*b*) from storage capacitor C1 through diode CR1 through the input load of inverter 103*a* between ground (node D) and node V+, through C2, through inductor L1 and through the collector and emitter of IGBT2. Inductor L1 and capacitor C2 form a series resonant circuit. The diode across IGBT2 may be reverse biased with respect to the voltage at negative input terminal B. The input voltage to inverter 103*a* with respect to ground (node D) and node V+ is derived across capacitor C2. Capacitor C2 may have the same value as capacitor C3; therefore, the resonant frequency of inductor L1 and capacitor C2 and corresponding resonant periodic time T may be substantially the same. When IGBT2 initially turns on, there may be both zero current through inductor L1 and through the collector and emitter of IGBT2 and may be substantially zero power loss at turn on of IGBT2. After IGBT2 initially turns on, the current through L1 and the current through the collector and emitter of IGBT2 may increase and then fall sinusoidally. When IGBT2 turns off (the on period of the switch corresponds to half of the resonant periodic time T) there may be close to zero current in inductor L1 and close to zero current through the collector and emitter of IGBT2. Therefore, there may be zero power loss at turn off of IGBT2. A positive current path between node V+ and positive input terminal A is completed through diode CR1 corresponding to half of the resonant periodic time T. Zero current switching (ZCS) may, therefore, be provided for both turn on and turn off of both switches IGBT1 and IGBT2.

Zero current switching (ZCS) may permit the use and implementation of slower switching speed transistors for IGBT1 and IGBT2, which may have a lower voltage drop between collector and emitter. Thus, both switching losses and conduction losses may be reduced. Similarly, slower integrated diodes of IGBT1 and IGBT2 with lower voltage drop may be used. Slower diodes CR1 and CR2 may also be used. Resonant current shape through the collector and emitter of IGBT1 and IGBT2 may also reduce the turn-on losses in the diodes CR1 and CR2, as well as generated electromagnetic interference (EMI).

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

The invention claimed is:

1. A method for converting power from a floating source of direct current (DC) power to a dual direct current (DC) output, wherein the floating source of DC power includes a positive input terminal and a negative input terminal, the dual DC output includes a positive output terminal, a negative output terminal and a ground terminal, the method including:
charging a charge storage device connected in parallel to the positive input terminal and the negative input terminal; and
discharging the charge storage device by first switching the negative input terminal through a resonant circuit to the negative output terminal during a first half of a period of the resonant circuit and second switching the positive input terminal through the resonant circuit to the positive output terminal during a second half of the period of the resonant circuit.

2. The method of claim 1, wherein said charging is supplied from the floating source of DC power.

3. The method of claim 1, wherein said resonant circuit includes an inductor connected in series with a capacitor.

4. The method of claim 1, the method further including:
during said second switching, providing a positive current path from the positive input terminal to the positive output terminal.

5. The method of claim 1, further including:
during said first switching, providing a negative return current path from the negative output terminal to the negative input terminal.

6. The method of claim 5, wherein said negative return current path allows only negative current to flow from said negative input terminal to said negative output terminal.

7. The method of claim 4, further including:
during said discharging, blocking current flow from said positive output terminal to said positive input terminal.

8. The method of claim 4, further including:
during said charging, blocking current flow from said positive output terminal to said negative input terminal.

9. The method of claim 4, wherein said positive current path allows only positive current to flow from said positive input terminal to said positive output terminal.

10. A device for converting power from a floating source of DC power to a dual direct current (DC) output, the device including:
a positive input terminal and a negative input terminal connectible to the floating source of DC power;
a positive output terminal, a negative output terminal and a ground terminal connectible to the dual DC output;
a charge storage device connected in parallel to the positive input terminal and the negative input terminal; wherein said charge storage device is charged from the positive input terminal and the negative input terminal; and
a resonant circuit connected between the charge storage device and the dual DC output, wherein said charge storage device is adapted to discharge through said resonant circuit by switching through to selectively either the negative output terminal or the positive output terminal.

11. The device of claim 10, further including:
a negative return current path from the negative input terminal to the negative output terminal.

12. The device of claim 11, wherein the negative return current path includes:
a diode including an anode connected to the negative output terminal and a cathode connected to the negative input terminal.

13. The device of claim 10, further including:
a switch connected between the positive input terminal and the resonant circuit, wherein said switch when closed discharges said charge storage device through said resonant circuit to the negative output terminal, wherein when said switch is open, said charge storage device is charged from said positive input terminal.

14. The device of claim 13, wherein said charge storage device is charged from the positive input terminal and the negative input terminal and discharged through said resonant circuit by switching said switch.

15. The device of claim 13, wherein the switch includes:
an integral diode with a cathode connected to the positive input terminal and an anode connected to the resonant circuit.

16. The device of claim 10, further including:
a second switch connected between the negative input terminal and the resonant circuit, wherein said second switch when closed discharges said charge storage device through said resonant circuit to the positive output terminal, wherein when said second switch is open, said charge storage device is charged from said positive input terminal.

17. The device of claim 16, wherein said charge storage device is charged from the positive input terminal and the negative input terminal and discharged through said resonant circuit by switching said second switch.

18. The device of claim 16, wherein the second switch includes:
a second integral diode with an anode connected to the negative input terminal and a cathode connected to the resonant circuit.

19. The device of claim 10, further including:
a positive current path from the positive input terminal to the positive output terminal.

20. The device of claim 19, wherein the positive current path includes:
a diode with a cathode connected to the positive output terminal and an anode connected to the positive input terminal.

21. The device of claim 10, wherein the positive output terminal, the negative output terminal and the ground terminal feed an inverter, wherein said inverter is one of a two level inverter and a three level inverter.

22. The device of claim 10, wherein said resonant circuit includes:
a first insulated gate bipolar transistor (IGBT) including:
a first collector attached to the positive input terminal;
a first emitter;
a first diode including a first anode and a first cathode, with said first cathode connected to the first collector and said first anode connected to the first emitter;
a first base attached to a first drive circuit;
a second IGBT including:
a second collector attached to the first emitter to provide a third node;
a second emitter connected to the negative input terminal;
a second diode with a second cathode connected to the second collector and a second anode connected to the second emitter;
a second base attached to a second drive circuit;
a DC output positive terminal;
a second capacitor connected between the DC output positive terminal and electrical ground;
a DC output negative terminal;
a third capacitor connected between the DC output negative terminal and electrical ground; and
an inductor connected between the third node and electrical ground.

* * * * *